United States Patent
Mase et al.

(10) Patent No.: US 7,546,768 B2
(45) Date of Patent: Jun. 16, 2009

(54) MOUNTING STRUCTURE OF ANGULAR RATE SENSOR

(75) Inventors: Shunji Mase, Handa (JP); Mutsuhito Ogino, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/907,636

(22) Filed: Oct. 16, 2007

(65) Prior Publication Data

US 2008/0060437 A1   Mar. 13, 2008

Related U.S. Application Data (62) Division of application No. 11/216,131, filed on Sep. 1, 2005, now Pat. No. 7,318,348.

(30) Foreign Application Priority Data

Sep. 2, 2004  (JP)  ............... 2004-255716
Sep. 21, 2004 (JP)  ............... 2004-273419

(51) Int. Cl.
*G01P 1/02*  (2006.01)
*G01P 9/04*  (2006.01)
(52) U.S. Cl. ............... 73/493; 73/504.12; 73/504.14
(58) Field of Classification Search ............... 73/493, 73/431, 866.5, 504.12, 504.04, 504.02, 504.14
See application file for complete search history.

(56) References Cited

U.S. PATENT DOCUMENTS

| 5,604,312 | A | 2/1997 | Luts |
| 5,728,936 | A | 3/1998 | Luts |
| 6,182,508 | B1 * | 2/2001 | Takeuchi et al. ............... 73/493 |
| 6,240,780 | B1 * | 6/2001 | Negoro et al. ............ 73/504.12 |
| 6,250,156 | B1 * | 6/2001 | Seshia et al. ............. 73/504.12 |
| 6,386,033 | B1 * | 5/2002 | Negoro ................... 73/504.12 |
| 6,516,666 | B1 | 2/2003 | Li |

FOREIGN PATENT DOCUMENTS

JP   B2-2888029   11/1993

* cited by examiner

*Primary Examiner*—Helen C. Kwok
(74) *Attorney, Agent, or Firm*—Posz Law Group, PLC (57) ABSTRACT

An angular rate sensor includes: a substrate; a drive-purpose vibrator capable of vibrating in a first direction; and an angular velocity detection-purpose vibrator capable of vibrating in a second direction. The sensor detects an angular velocity on the basis of vibration of the angular velocity detection-purpose vibrator in the second direction caused by a Coriolis force, when the drive-purpose vibrator is vibrated in the first direction, and the angular velocity is applied to the sensor in a third direction. The angular velocity detection-purpose vibrator has a length along with the second direction and a width along with the first direction. A ratio between the width and the length is equal to or larger than 0.1.

7 Claims, 6 Drawing Sheets

$y = 0.0148x^4 - 0.0076x^3 + 0.0015x^2 - 0.0001x + 6 \times 10^{-6}$

RATIO $X = W/L$

//MOUNTING STRUCTURE OF ANGULAR RATE SENSOR

CROSS REFERENCE TO RELATED APPLICATIONS

This application is a divisional of allowed U.S. application Ser. No. 11/216,131 which is based on Japanese Patent Applications No. 2004-255716 filed on Sep. 2, 2004, and No. 2004-273419 filed on Sep. 21, 2004, the disclosures of which are incorporated herein by reference.

FIELD OF THE INVENTION

The present invention relates to an angular rate sensor and a mounting structure of an angular rate sensor.

BACKGROUND OF THE INVENTION

An angular rate sensor includes a drive-purpose vibrator capable of vibrating along a first direction and an angular velocity detection-purpose vibrator capable of vibrating along a second direction perpendicular to the first direction.

Generally speaking, this sort of angular rate sensor has been constituted by employing a supporting substrate, the drive-purpose vibrator, and the angular velocity detection-purpose vibrator. The drive-purpose vibrator has been supported on this supporting substrate in such a manner that the drive-purpose vibrator can be vibrated along the first direction. The angular velocity detection-purpose vibrator has been supported on the supporting substrate in such a manner that the angular velocity detection-purpose vibrator can be vibrated along the second direction perpendicular to the first direction. This sensor is disclosed in, for example, Japanese Patent No. 2888029.

However, since the angular velocity detection-purpose vibrator has been manufactured in such a shape which is elongated along the second direction, only a very small amount of the vibrations produced from the drive-purpose vibrator is transferred with respect to this angular velocity detection-purpose vibrator. Therefore, there are some possibilities that this angular velocity detection-purpose vibrator may bend along the width direction of the vibrator, i.e., along the first direction.

The angular velocity detection-purpose vibrator outputs the detected angular velocity in accordance with capacitance change produced between the angular velocity detection-purpose vibrator and an angular velocity detection-purpose fixed electrode. However, if the angular velocity detection-purpose vibrator bends, the capacitance change caused by this bending may occur, and thus, angular velocity components other than such an angular velocity component which should be originally detected are detected. As a result, the unwanted angular velocity components may cause a detection output error.

When the angular velocity detection-purpose vibrator bends along the first direction, this angular velocity detection-purpose vibrator is deformed also along the second direction in connection with the first direction. As a result, the distance (interval) between the angular velocity detection-purpose vibrator and the angular velocity detection-purpose fixed electrode along the second direction is changed. Thus, the capacitance change is produced based upon this distance change.

Thus, it is required to protect the angular velocity detection-purpose vibrator from bending due to driving vibrations of the drive-purpose vibrator, and further, it is required to reduce a detection output error.

Further, a mounting structure of an angular rate sensor in which a vibration type angular rate sensor is mounted on a base member. In the vibration type angular rate sensor, while a vibrator is driven to be vibrated, when an angular velocity is applied to this angular rate sensor, the applied angular velocity is detected based upon vibrations of the vibrator along a direction perpendicular to the driving vibration direction.

In general, as this sort of vibration type angular rate sensor, MEMS (Micro Electro Mechanical System) gyroscopes have been known.

Such a vibration type angular rate sensor has been arranged by employing: a base unit made of a semiconductor substrate, or the like; a vibrator coupled to the base unit; excitation means for driving the vibrator to be vibrated along a first direction; and detection means for detecting an angular velocity. That is, when the angular velocity is applied under driving vibrations of the vibrator, this detection means detects the applied angular velocity based upon the vibrations of the vibrator along a second direction perpendicular to the first direction.

Such a vibration type angular rate sensor is employed as a yaw rate sensor for detecting a yaw rate in a system such as, for instance, a Vehicle Stability Control (VSC) and a navigation system. This vibration type angular rate sensor is mounted on a vehicle under such a condition that this yaw rate sensor is mounted on, for example, amounting board of an Electronic Control Unit (ECU) as a base member.

In this case, an angular rate sensor is mounted in such a way that a detection axis corresponding to a rotation axis of an angular velocity is directed to an upper and lower direction of a vehicle, namely the vertical direction.

However, in such a case that this angular rate sensor is used so as to detect any other angular velocities than a yaw rate, the sensor is mounted in such a manner that a detection axis of an angular velocity is located parallel to a horizontal plane. The angular velocities other than this yaw rate correspond to, for instance, an angular velocity around an axis of a forward and backward direction of a vehicle, namely a roll rate, and also correspond to an angular velocity around an axis of a right and left direction of the vehicle, namely a pitch rate.

As a result, in the angular rate sensor, there are some risks that adverse influences caused by the upper and lower vibrations of the vehicle and the gravitational acceleration may be given with respect to the driving vibrations depending upon the direction of the driving vibrations of the vibrators. In other words, when the above-described upper and lower vibrations of the vehicle and the gravitational acceleration are applied to the vibrators along the above vibration direction, the vibrating conditions of the driving vibrations become unequal to each other.

Originally, in a vibration type angular rate sensor, it is important how to stabilize driving vibrations of vibrators. However, a leakage of vibrations may occur in response to a change in conditions of the driving vibrations, and/or electric anomalies, caused by the driving vibrations being superimposed upon detection signals, so that precision of sensor output signals may be deteriorated.

Therefore, it is required, even when a detection axis of an angular velocity is directed to the horizontal plane, driving vibrations of vibrators is stabilized as much as possible.

SUMMARY OF THE INVENTION

In view of the above-described problem, it is an object of the present invention to provide an angular rate sensor having high accuracy. It is another object of the present invention to provide a mounting structure of an angular rate sensor for detecting an angular velocity parallel to a horizontal plane.

An angular rate sensor includes: a support substrate; a drive-purpose vibrator supported on the substrate through a drive beam in such a manner that the vibrator is capable of vibrating in a first direction; and an angular velocity detection-purpose vibrator supported on the substrate through a detection beam in such a manner that the vibrator is capable of vibrating in a second direction, which is perpendicular to the first direction. The angular velocity detection-purpose vibrator extends in the second direction. The detection beam is deformable in the second direction, and the drive beam is deformable in the first direction. The sensor detects an angular velocity on the basis of vibration of the angular velocity detection-purpose vibrator in the second direction, the vibration which is caused by a Coriolis force applied to the drive-purpose vibrator, in a case where the drive-purpose vibrator is vibrated in the first direction, and where the angular velocity is applied to the sensor in a third direction so that the third direction provides a rotation axis of the angular velocity. The third direction is perpendicular to both of the first and the second directions. The angular velocity detection-purpose vibrator has a length along with the second direction and a width along with the first direction. A ratio between the width and the length of the angular velocity detection-purpose vibrator is equal to or larger than 0.1.

In the above sensor, bending amount of the angular velocity detection-purpose vibrator in the second direction caused by driving vibration of the drive-purpose vibrator becomes sufficiently small. Thus, output error in the sensor is reduced so that detection accuracy of the sensor is improved.

Preferably, the ratio between the width and the length of the angular velocity detection-purpose vibrator is defined as X. The angular velocity detection-purpose vibrator has a displacement amount in the second direction when the drive-purpose vibrator is vibrated in the first direction. The displacement amount of the angular velocity detection-purpose vibrator is defined as Y in millimeters. The ratio and the displacement amount have a relationship of:

$Y=0.0148X^4-0.0076X^3+0.0015X^2-0.0001X+6\times10^{-6}$.

Further, a mounting structure includes: a sensor; and a mounting board for mounting the sensor thereon. The sensor includes a vibrator capable of vibrating in a first direction. The sensor detects an angular velocity on the basis of vibration of the vibrator in a second direction in a case where the vibrator is vibrated in the first direction, and where the angular velocity is applied to the sensor in a third direction so that the third direction provides a rotation axis of the angular velocity. The second direction is perpendicular to the first direction, and the third direction is perpendicular to both of the first and the second directions. The third direction is in parallel to a horizontal plane perpendicular to a gravitational direction, and the first direction is in parallel to the horizontal plane.

In the sensor, the vibrating direction of the vibrator is perpendicular to a gravitational direction. Thus, the gravity does not affect the driving vibration of the vibrator substantially. Thus, the driving vibration of the vibrator is stable as much as possible.

Preferably, the sensor and the board are used in an automotive vehicle. In this case, the vibrating direction of the vibrator is perpendicular to an up-and-down oscillation of an automotive vehicle. Thus, the up-and-down oscillation of the vehicle does not affect the driving vibration of the vibrator substantially.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 4:
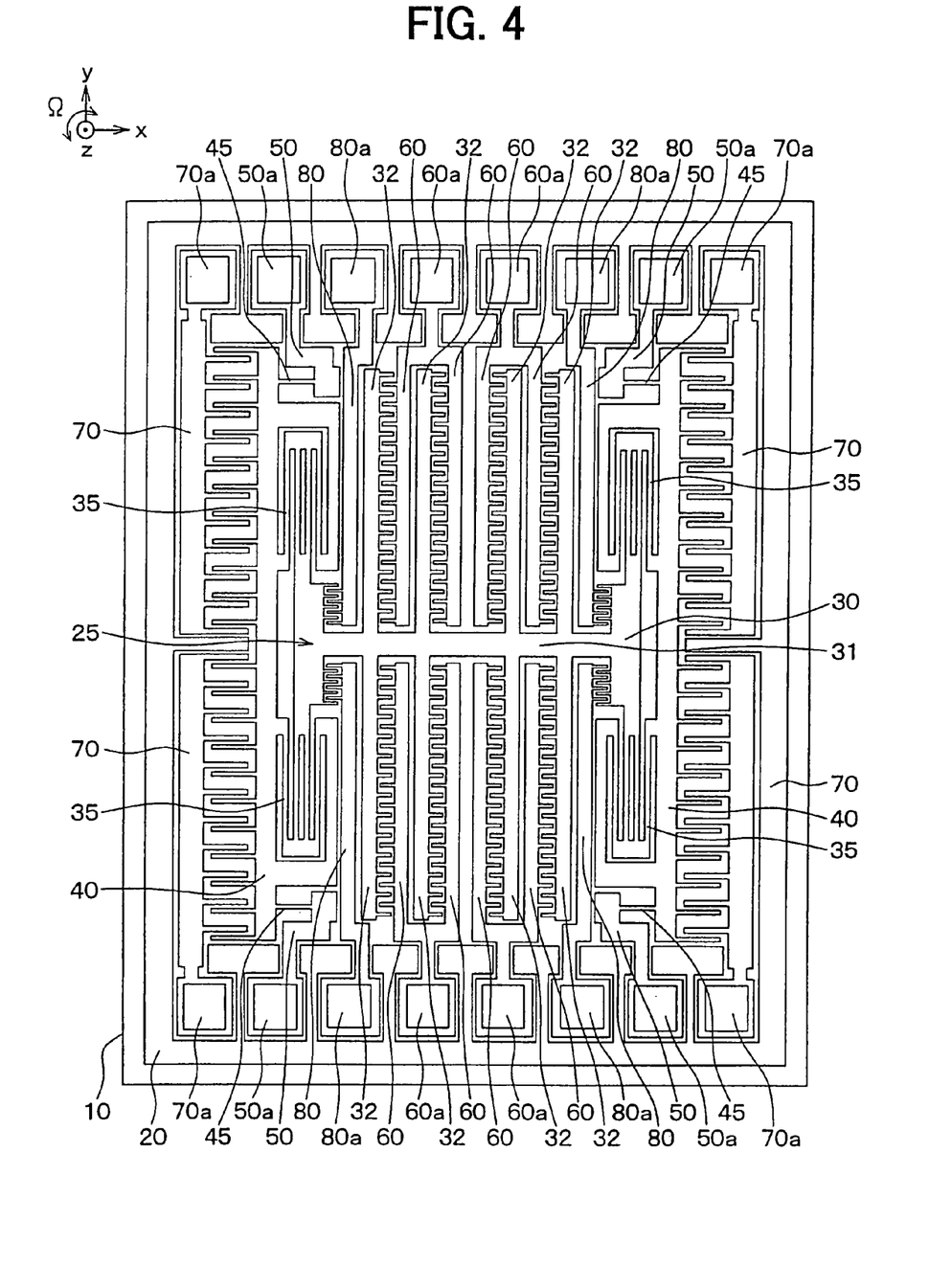
FIG. 4 is a plan view showing an angular rate sensor as a prototype, according to a first embodiment.

The Inventors of the present invention experimentally manufactured and investigated angular rate sensors with respect to a related art. FIG. 4 is a diagram for schematically showing a plane structure of an angular rate sensor as a trial product thereof.

This angular rate sensor is made of a semiconductor substrate 10 such as a silicon substrate. Since trenches have been formed in this semiconductor substrate 10 by employing the well-known semiconductor manufacturing technique such as an etching process, as indicated in FIG. 4, a movable electrode 25 and respective electrodes 60, 70, 80, have been segmented to be formed. The movable electrode 25 contains vibrators 30 and 40.

The movable electrode 25 has been arranged by providing a drive-purpose vibrator 30, an angular velocity detection-purpose vibrator 40, a drive beam 35 for coupling both the vibrators 30 and 40 to each other, and a detection beam 45 for coupling the angular velocity detection-purpose vibrator 40 to the substrate 10.

The drive-purpose vibrator 30 has been constituted by providing a weight unit 31 and a plurality of elongation units 32. This weight unit 31 is elongated along an "x" direction shown in FIG. 4. The plural elongation units 32 are elongated along a "y" direction on both sides of this weight unit 31.

Also, two sets of the angular velocity detection-purpose vibrators 40 have been provided on both outsides of the weight unit 31 of the drive-purpose vibrator 30 in the x direction (will be referred to as "first direction x" herein after) indicated in FIG. 4, and have been formed in a narrow shape which is elongated along the y direction (will be referred to as "second direction y" herein after).

In this case, both edge portions of the weight unit 31 of the drive-purpose vibrator 30 have been coupled via the drive beam 35 to the angular velocity detection-purpose vibrator 40. Then, the angular velocity detection-purpose vibrator 40 has been coupled via the detection beams 45 with respect to an anchor unit 50 which corresponds to a fixing unit to the substrate 10. As a consequence, the movable unit 25 can be moved along a direction parallel to the substrate plane of the substrate 10 by coupling four sets of the detection beams 45 to the anchor unit 50.

In this case, the drive beam 35 includes a degree of freedom along the first direction "x". Also, each of the detection beams 45 includes a degree of freedom along the second direction "y". Since the drive beam 35 and the detection beam 45 have been constructed in the above-explained manner, the drive-purpose vibrator 30 has been supported with respect to a supporting substrate 11 under such a condition that this drive-purpose vibrator 30 can be displaced along the first direction "x", whereas the angular velocity detection-purpose vibrator 40 has been supported with respect to the supporting substrate 11 under such a condition that this angular velocity detection-purpose vibrator 40 can be displaced along the second direction "y" which is perpendicular to the first direction "x".

Also, as shown in FIG. 4, a drive-purpose fixed electrode 60 fixed on the substrate 10 has been arranged in an opposite manner on a side surface of each of elongation units 32 of the drive-purpose vibrator 30. Also, angular velocity detection-purpose fixed electrodes 70 fixed to the substrate 10 have been arranged on the outer side surfaces of the angular velocity detection-purpose vibrator 40 in such a manner that the angular velocity detection-purpose fixed electrode 70 are located opposite to each other.

It should be understood that in the angular rate sensor shown in FIG. 4, the vibration detection-purpose fixed electrode 80 fixed on the substrate 10 has been arranged opposite thereto on the drive-purpose vibrator 30. This vibration detection-purpose fixed electrode 80 has been constituted as a monitor electrode which monitors drive vibrations of the drive-purpose vibrator 30 along the first direction "x".

A description is made of detecting operations of such an angular rate sensor. The detecting operations are carried out via the respective pads 50a, 60a, 70a, 80a, and the respective electrodes 60 to 80.

First, the drive-purpose vibrator 30 is driven to be vibrated via the drive-purpose fixed electrode 60 along the first direction x. When an angular velocity "Ω" as an angular rate to be detected is applied around an axis "z" which is perpendicular to both the first direction "x" and the second direction "y" under this driving and vibrating operation, the angular velocity detection-purpose vibrator 40 is vibrated along the second direction "y" so as to detect the applied angular velocity "Ω" by Coriolis force which is applied to the vibration-purpose vibrator 30.

A distance between the angular velocity detection-purpose vibrator 40 and the angular velocity detection-purpose fixed electrode 70 is changed by the detecting vibrations of this angular velocity detection-purpose vibrator 40, and thus, the detection of the angular velocity "Ω" is carried out based upon a change in capacitances between the angular velocity detection-purpose vibrator 40 and the angular velocity detection-purpose fixed electrode 70.

In the angular rate sensor having such an arrangement, when the driving vibration is produced, it is preferable that only the drive-purpose vibrator 30 is vibrated.

However, since the angular velocity detection-purpose vibrator 40 has been manufactured in such a shape which is elongated along the second direction "y", only a very small amount of the vibrations produced from the drive-purpose vibrator 30 is transferred with respect to this angular velocity detection-purpose vibrator 40. Therefore, there are some possibilities that this angular velocity detection-purpose vibrator 40 may bend along the width direction of the vibrator 40, i.e., along the first direction "x".

The angular velocity detection-purpose vibrator 40 outputs the detected angular velocity in accordance with the capacitance change produced between the angular velocity detection-purpose vibrator 40 and the angular velocity detection-purpose fixed electrode 70. However, if the angular velocity detection-purpose vibrator 40 bends, the capacitance change caused by this bending may occur, and thus, angular velocity components other than such an angular velocity component which should be originally detected are detected. As a result, the unwanted angular velocity components may cause a detection output error.

When the angular velocity detection-purpose vibrator 40 bends along the first direction "x", this angular velocity detection-purpose vibrator 40 is deformed also along the second direction "y" in connection with the first direction "x". As a result, the distance (interval) between the angular velocity detection-purpose vibrator 40 and the angular velocity detection-purpose fixed electrode 70 along the second direction "y" is changed. Thus, the capacitance change is produced based upon this distance change.

Thus, it is required to protect the angular velocity detection-purpose vibrator from bending due to driving vibrations of the drive-purpose vibrator, and further, it is required to reduce a detection output error.

Figure 1:
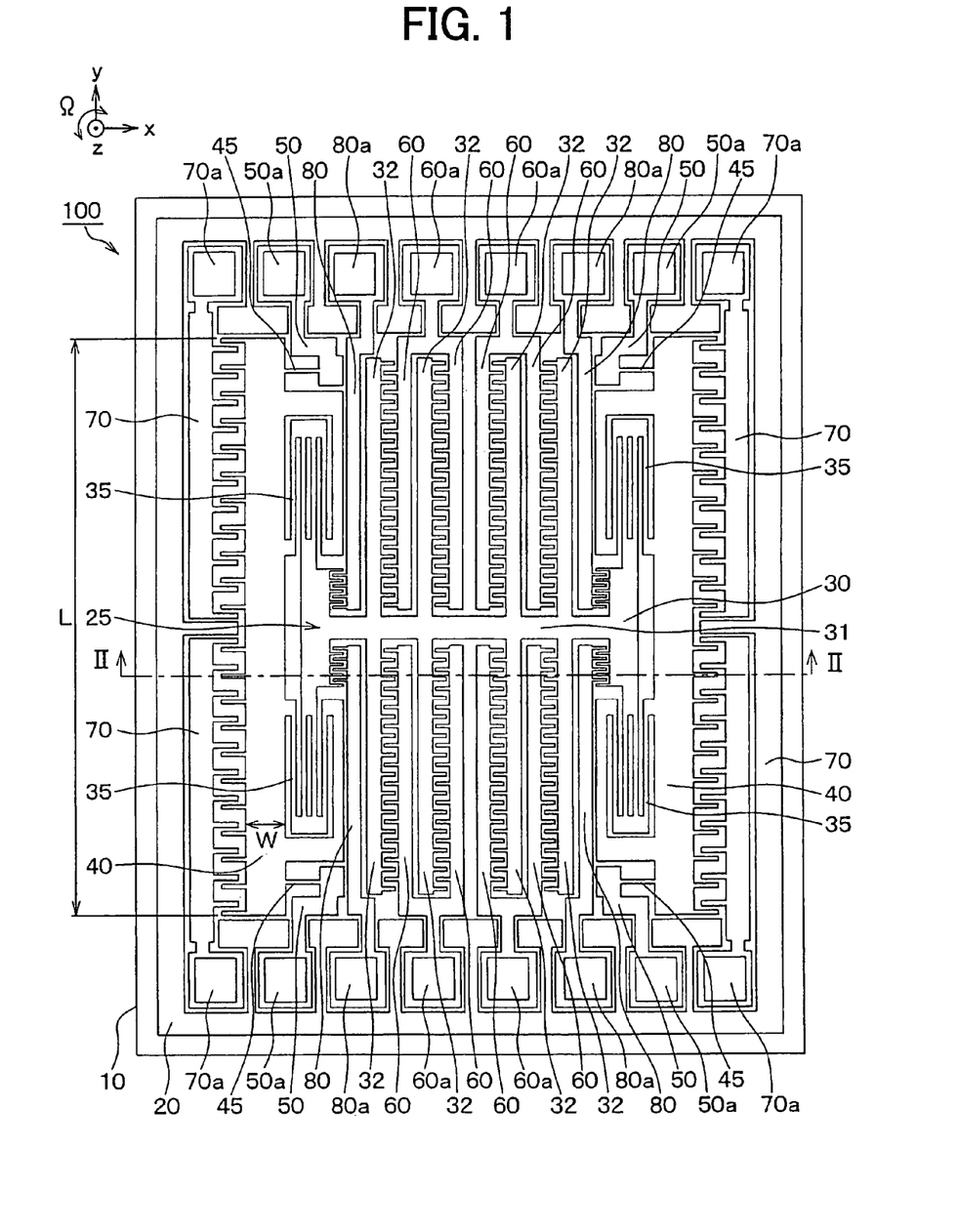
FIG. 1 is a plan view showing a capacitance type angular rate sensor according to a first embodiment of the present invention.

To solve the above problem, a capacitance type angular rate sensor 100 according to a first embodiment mode of the present invention is provided. FIG. 1 shows the sensor. Also, FIG. 2 is a sectional view for schematically indicating the capacitance type angular rate sensor 100, taken along line II-II in FIG. 1.

This angular rate sensor 100 is made of a semiconductor substrate 10 such as a silicon substrate. Since trenches have been formed in this semiconductor substrate 10 by employing the well-known semiconductor manufacturing technique such as an etching process, as indicated in FIG. 1, a frame unit 20 has been segmented to be formed in an outer peripheral unit of this semiconductor substrate 10, and also, a movable electrode 25 and respective fixed electrodes 60, 70, 80, have been segmented to be formed in an inner peripheral portion thereof. The movable electrode 25 contains vibrators 30 and 40.

Figure 2:
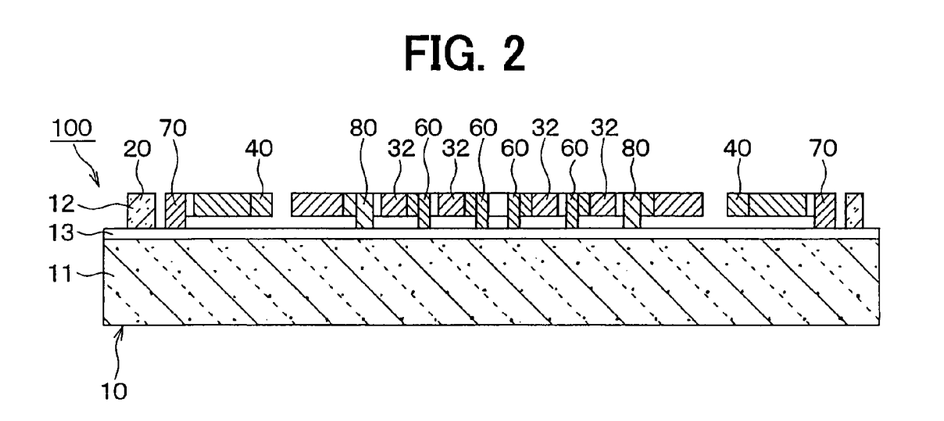
FIG. 2 is a cross sectional view showing the sensor taken along line II-II in FIG. 1.

As shown in FIG. 2, the semiconductor substrate 10 corresponds to an SOI (silicon-on insulator) substrate which is manufacture by sandwiching an insulating film 13 such as a silicon oxide film between a first semiconductor layer 11 functioning as a supporting substrate, and a second semiconductor layer 12 located over the first semiconductor layer 11.

Then, in this semiconductor substrate 10, since both a trench etching process and a release etching process were carried out from the front surface of the second semiconductor layer 12, the frame unit 20, the movable electrode 25, and the respective fixed electrodes 60 to 80, which have been previously described and segmented, have been formed with respect to the second semiconductor layer 12.

As represented in FIG. 2, both the frame unit 20 and the respective fixed electrodes 60 to 80 among these structural units have been supported via the insulating layer 13 by the first semiconductor substrate 11 functioning as the supporting substrate so as to be fixed. As previously explained, both the frame unit 20 and the respective fixed electrodes 60 to 80 correspond to fixed structural units which have been fixed on the supporting substrate 11 (namely, substrate 10).

The movable electrode 25 has been arranged by providing a drive-purpose vibrator 30, an angular velocity detection-purpose vibrator 40, a drive beam 35 for coupling both the vibrators 30 and 40 to each other, and a detection beam 45 for coupling the angular velocity detection-purpose vibrator 40 to the first semiconductor substrate 11 functioning as the supporting substrate.

The drive-purpose vibrator 30 has been constituted by providing a weight unit 31 and elongation units 32. This weight unit 31 is elongated along an "x" direction shown in FIG. 1. The elongation units 32 are elongated along a "y" direction on both sides of this weight unit 31. In this example, four sets of the elongation units 32 have been provided on the upper side of the weight unit 31, and four sets of the elongation units 32 have been provided on the lower side thereof, namely, eight sets of these elongation units 32 have been provided in total.

Also, two sets of the above-described angular velocity detection-purpose vibrators 40 have been provided on both outsides of the weight unit 31 of the drive-purpose vibrator 30 in the x direction (will be referred to as "first direction x" herein after) indicated in FIG. 1, and have been formed in a narrow shape which is elongated along the y direction (will be referred to as "second direction y" herein after).

In this embodiment mode, such a specific structure has been employed, in which a ratio (W/L) is larger than, or equal to 0.1, while this ratio is defined by a length "L" along the second direction "y" and a width "W" along the first direction "x" as to this angular velocity detection-purpose vibrator 40. The reason why this ratio (W/L) is set to be larger than or equal to 0.1 will be discussed later.

In this case, both edge portions of the weight unit 31 of the drive-purpose vibrator 30 have been coupled via the drive beam 35 to the angular velocity detection-purpose vibrator 40. As indicated in FIG. 1, the drive-purpose vibrator 30 has been coupled to the angular velocity detection-purpose vibrators 40 by four sets of the drive beams 35.

Then, this angular velocity detection-purpose vibrator 40 has been coupled via a detection beam 45 with respect to an anchor unit 50 corresponding to a fixing unit with respect to the supporting substrate 11. Similar to the frame unit 20 and the like shown in FIG. 2, this anchor unit 50 has been supported via the insulating film 13 onto the first semiconductor layer 11 functioning as the supporting substrate and has been fixed on this first semiconductor layer 11.

While four sets of the anchor units 50 have been provided, the detection beams 45 have been coupled as cantilever beams with respect to the respective anchor units 50. As a result, since four sets of the detection beams are coupled via the anchor units 50 to the supporting substrate 11, the movable unit 25 has been supported in such a manner that this movable unit 25 may be floated over the supporting substrate 11.

Further, the angular velocity detection-purpose vibrator 40 has been coupled and supported via the detection beam 45 onto the supporting substrate 11. Although the drive-purpose vibrator 30 has interposed both the angular velocity detection-purpose vibrator 40 and the detection beam 45, this drive-purpose vibrator 30 has been coupled via the drive beam 35 to the supporting substrate 11.

In this case, the drive beam 35 includes a degree of freedom along the first direction "x". In this example, as represented in FIG. 1, the drive beam 35 includes a plurality of beams, and can be operated in a spring displaceable manner essentially only along the first direction x.

Also, the detection beam 45 includes a degree of freedom along the second direction "y". In this example, as shown in FIG. 1, the detection beam 45 is formed in such a beam shape which is elongated along the x direction, and can be operated in a spring displaceable manner essentially only along the second direction "y". It should be understood that a resonant frequency of the drive beam 35 is different from a resonant frequency of each of the detection beams 45.

Since the drive beam 35 and the detection beams 45 have been constructed in the above-explained manner, the drive-purpose vibrator 30 has been supported with respect to the supporting substrate 11 under such a condition that this drive-purpose vibrator 30 can be displaced along the first direction "x". The angular velocity detection-purpose vibrator 40 has been supported with respect to the supporting substrate 11 under such a condition that this angular velocity detection-purpose vibrator 40 can be displaced along the second direction "y" which is perpendicular to the first direction "x". As a consequence, the movable unit 25 can be moved along such a direction parallel to the substrate plane of the supporting substrate 11.

Also, in each of the anchor units 50 to which the detection beam 45 of the movable electrode 25 has been coupled, a pad 50a for detecting an angular velocity has been formed, while this detection beam 45 supports the movable unit 25 in the cantilever manner. This angular velocity detection-purpose pad 50a has been electrically connected to the detection beam 45. A predetermined voltage may be applied via this pad 50a with respect to both the drive-purpose vibrator 30 and the angular velocity detection-purpose vibrator 40.

Also, a shown in FIG. 1, a drive-purpose fixed electrode 60 fixed on the supporting substrate 11 has been arranged in an opposite manner on a side surface of each of the elongation units 32 of the drive-purpose vibrator 30. Then, at such portions that the elongation unit 32 of the drive-purpose vibrator 30 is located opposite to the drive-purpose fixed electrode 60, comb tooth-shaped units have been provided in such a manner that these comb tooth-shaped units are projected from opposite planes thereof to the counter party in a comb tooth form, and the comb teeth thereof are interleaved with each other.

Each of the drive-purpose fixed electrodes 60 has been electrically connected to the drive-purpose pad 60a provided in the vicinity of the frame unit 20. Then, a drive voltage may be applied through this drive-purpose pad 60a to the drive-purpose fixed electrode 60.

Also, as indicated in FIG. 1, angular velocity detection-purpose fixed electrodes 70 fixed to the supporting substrate 11 have been arranged on the outer side surfaces of the angular velocity detection-purpose vibrator 40 in such a manner that the angular velocity detection-purpose fixed electrodes 70 are located opposite to each other. In this case, two sets of the angular velocity detection-purpose fixed electrodes 70 have been provided in an upper and lower direction with respect to one vibrator of the angular velocity detection-purpose vibrators 40.

Then, at such portions that the angular velocity detection-purpose vibrator 40 is located opposite to the angular velocity detection-purpose fixed electrode 70, comb tooth-shaped units have been provided in such a manner that these comb tooth-shaped units are projected from opposite planes thereof to the counter party in a comb tooth form, and the comb teeth thereof are interleaved with each other.

Each of the angular velocity detection-purpose fixed electrodes 70 has been electrically connected to an angular velocity detection-purpose pad 70a provided in the vicinity of the frame unit 20. Then, a potential of the angular velocity detection-purpose fixed electrode 70 through this angular velocity detection-purpose pad 70a can be measured.

Also, as shown in FIG. 1, the vibration detection-purpose fixed electrodes 80 fixed to the supporting substrate 11 have been arranged on the drive-purpose vibrator 30 in such a manner that the vibration detection-purpose fixed electrodes 80 are located opposite to the drive-purpose vibrator 30. In this case, two sets of these vibration detection-purpose fixed electrodes 80 have been provided along the upper and lower direction at positions outside the drive-purpose fixed electrode 60, namely four sets of these vibration detection-purpose fixed electrodes 80 have been provided in total.

Then, at such portions that the drive-purpose vibrator 30 is located opposite to the vibration detection-purpose fixed electrodes 80, comb tooth-shaped units have been provided in such a manner that these comb tooth-shaped units are projected from opposite planes thereof to the counter party in a comb tooth form, and the comb teeth thereof are interleaved with each other.

Each of the vibration detection-purpose fixed electrodes 80 has been electrically connected to a vibration detection-purpose pad 80a provided in the vicinity of the frame unit 20. Then, a potential of the vibration detection-purpose fixed electrode 80 through this vibration detection-purpose pad 80a can be measured.

It should also be noted that while the frame unit 20 has been constituted in such a manner that this frame unit 20 surrounds both the movable electrode 25 containing the above-described vibrators 30 and 40 and the respective fixed electrodes 60, 70. 80, this frame unit 20 is maintained via a pad (not shown) and the like to the GND potential. The angular rate sensor 100, according to this embodiment mode, has been arranged by employing the above-explained arrangement.

Next, a driving method of the angular rate sensor 100 according to this embodiment mode will now be explained.

The angular rate sensor 100 of this embodiment mode is driven by applying a desirable drive voltage with respect to the drive-purpose pad 60a to which the drive-purpose fixed electrode 60 has been electrically connected.

When the desirable drive voltage is applied to the drive-purpose pad 60a, attracting force is produced based upon a capacitance formed between the drive-purpose fixed electrode 60 and the elongation unit 32 of the drive-purpose vibrator 30 in response to a periodic variation of an AC component of the drive voltage. As a result, the drive beam 35 bends, so that the drive-purpose vibrator 30 is vibrated along the first direction "x", namely is caused for driving vibrations.

At this time, an overlap amount between the comb tooth-shaped unit formed in the vibration detection-purpose fixed electrode 80 and the comb tooth-shaped unit formed in the drive-purpose vibrator 30 is varied in response to this drive vibration. As a result, the capacitance which is formed by these comb tooth-shaped units is changed.

A magnitude of this drive vibration can be monitored by measuring this capacitance change based upon a potential of the vibration detection-purpose pad 80a to which the vibration detection-purpose fixed electrode 80 has been connected. As a consequence, the drive voltage is feedback-controlled in response to the magnitude of the drive vibration in order that the magnitude of the drive vibration becomes a desirable value.

Under such a condition that this driving vibration is carried out, when an angular velocity "Ω" around a rotation axis "z" which is perpendicular to both the first direction "x" and the second direction "y" is inputted, Coriolis force is generated, and thus, the entire portion of the movable electrode 25 containing both the drive-purpose vibrator 30 and the angular velocity detection-purpose vibrator 40 performs a detection vibration along the second direction "y" due to a bending of the detection beam 45.

As a result, the interval between the comb tooth-shaped unit provided in the angular velocity detection-purpose vibrator 40 and the comb tooth-shaped unit provided in the angular velocity detection-purpose fixed electrode 70 is changed, so that the capacitance which is formed by these comb tooth-shaped units is changed. Then, since the potential of the angular velocity detection-purpose fixed electrode 70 is changed in connection with this change of the capacitance, the angular velocity "Ω" can be detected by measuring this potential change.

On the other hand, in accordance with this embodiment mode, in the angular rate sensor 100 equipped with: the supporting substrate 11; the drive-purpose vibrator 30 supported on the supporting substrate 11 in the vibratable manner along the first direction "x"; and the angular velocity detection-purpose vibrator 40 supported on the supporting substrate 11 in the vibratable manner along the second direction "y" perpendicular to the first direction "x", the below-mentioned points are featured.

The angular velocity detection-purpose vibrator 40 has been coupled via the detection beam 45 having the degree of freedom along the second direction "y" to the supporting substrate 11 and supported by this supporting substrate 11, and also includes such a shape which is elongated along the second direction "y".

The vibration-purpose vibrator 30 has been coupled via the drive beam 35 having the degree of freedom along the first direction "x" to the angular velocity-purpose vibrator 40 and supported by this angular velocity-purpose vibrator 40.

When the angular velocity "Ω" is applied around the axis "z" based upon the vibration of the drive-purpose vibrator 30 along the first direction "x", the angular velocity detection-purpose vibrator 40 is vibrated along the second direction "y" by the Coriolis force applied to the drive-purpose vibrator 30, and thus, the angular velocity "Ω" is detected based upon the vibration of this angular velocity detection-purpose vibrator 40.

The ratio (W/L) of the length "L" along the second direction "y" to the width "W" along the first direction "x" as to the angular velocity detection-purpose vibrator 40 is larger than, or equal to 0.1. This embodiment mode includes the above-explained structural points as the feature.

A description is made of the reason why the above-explained ratio (W/L) is larger than, or equal to 0.1.

As previously explained, in such a case that the angular velocity detection-purpose vibrator 40 includes such a shape elongated along the second direction "y", the vibration produced from the drive-purpose vibrator 30 is transferred with respect to this angular velocity detection-purpose vibrator 40, and thus, there are some possibilities that the angular velocity detection-purpose vibrator 40 bends along the width direction thereof, namely the first direction "x".

When the angular velocity detection-purpose vibrator 40 bends along the first direction "x", this angular velocity detection-purpose vibrator 40 is deformed also along the second direction "y" in connection with this bending of the vibrator 40. As a result, since the distance (interval) is changed which is defined between the angular velocity detection-purpose vibrator 40 and the angular velocity detection-purpose fixed electrode 70 along the second direction "y", a capacitance change between both the vibrator 40 and the electrode 70 occurs. As a result, angular velocity components other than such an angular velocity component which should be originally detected are detected, resulting in an output error.

In order that the bending of the angular velocity detection-purpose vibrator 40 along the first direction "x" is suppressed and the displacement of the angular velocity detection-purpose vibrator 40 along the second direction "y" in connection with the bending of the vibrator 40 is suppressed, the following technical idea may be conceived. That is, the width "W" of the angular velocity detection-purpose vibrator 40 along the first direction "x" is made wide, and also the rigidness thereof along the same first direction "x" may be increased.

However, it is not practically possible to simply widen the width "W". Unless the width "W" is widened by considering the length "L" of the angular velocity detection-purpose vibrator 40, the rigidness of this angular velocity detection-purpose vibrator 40 cannot be increased.

As a consequence, as a parameter of the rigidness of the angular velocity detection-purpose vibrator 40 along the first direction "x", the ratio (W/L) of the length "L" along the second direction "y" to the width "W" along the first direction "x" in the angular velocity detection-purpose vibrator 40 has been employed in the embodiment mode (refer to FIG. 1).

Then, while the FEM (Finite Element Method) analysis was carried out, an investigation was made of a relationship between this ratio (W/L) and the displacement of the angular velocity detection-purpose vibrator 40 along the second direction "y". In this FEM analysis, as to driving vibrations, a time period of the driving vibrations produced by the drive-purpose vibrator 30 along the first direction "x" may be set to, for example, several KHz.

Figure 3:
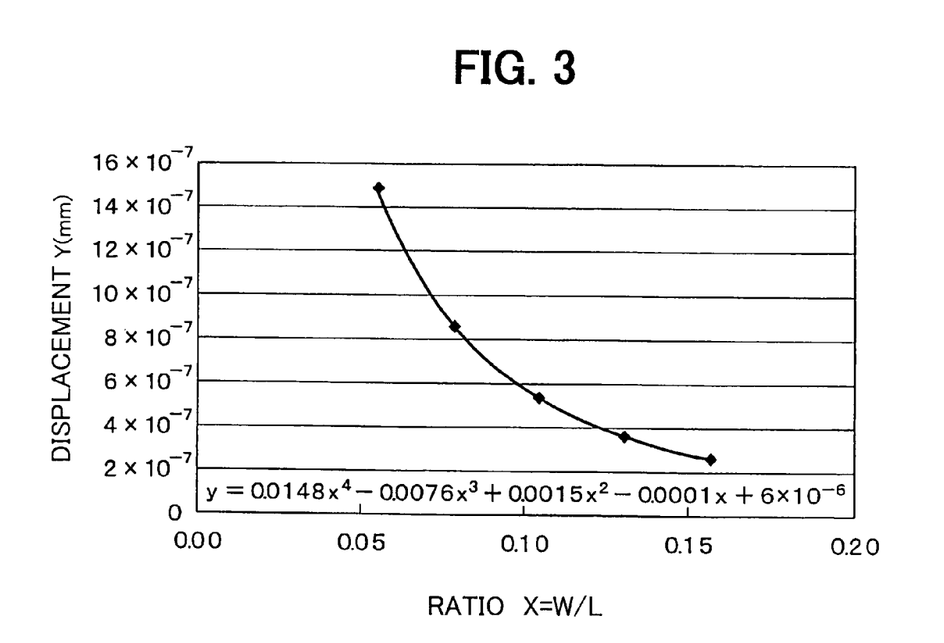
FIG. 3 is a graph showing a relationship between a ratio W/L and a displacement Y of an angular velocity detection-purpose vibrator in a y direction, according to the first embodiment.

FIG. 3 is a diagram for graphically showing results obtained by investigating a relationship between the ratio (W/L) in the driving vibrations by this FEM analysis and the displacement of the angular velocity detection-purpose vibrator 40 along the second direction "y" (namely, y-directional displacement). In FIG. 3, an abscissa indicates that the ratio (W/L) is expressed by symbol "X", whereas an ordinate shows that the y-directional displacement amount is expressed by symbol "Y", while a unit is defined as "mm".

As indicated in FIG. 3, in the angular rate sensor 100 according to this embodiment mode, both the ratio "X" and the displacement amount "Y" may satisfy a relationship which is expressed by the following formula 3.

$$Y=0.0148X^4-0.0076X^3+0.0015X^2-0.0001X+6\times10^{-6} \quad \text{(Formula 3)}$$

Thus, in accordance with the investigation made by the Inventors of the present invention, if the displacement amount "Y" is smaller than approximately $5\times10^{-7}$ to $6\times10^{-7}$ mm, then the capacitance change between the angular velocity detection-purpose vibrator 40 and the angular velocity detection-purpose fixed electrode 70 may become such a small capacitance change having no problem.

As a consequence, as indicated in FIG. 3, if the ratio (W/L) is larger than, or equal to 0.1, then the bending amount "Y" of the angular velocity detection-purpose vibrator 40 along the second direction "y", which is caused by the driving vibrations of the drive-purpose vibrator 30, can be reduced to such a small bending amount having no practical problem.

As previously described, in the angular rate sensor 100 equipped with both the drive-purpose vibrator 30 and the angular velocity detection-purpose vibrator 40, which have been supported on the supporting substrate 11 in such a manner that these vibrators 30 and 40 can be vibrated along the directions "x" and "y" perpendicular to each other, it can avoid that the angular velocity detection-purpose vibrator 40 bends by the driving vibration of the drive-purpose vibrator 30, and thus, the output error is produced.

Here, preferably, the ratio (W/L) is equal to or smaller than 0.20. In this case, the ratio (W/L) can be performed as a practical matter. More preferably, the ratio (W/L) is equal to or smaller than 0.15. In this case, as shown in FIG. 3, the ratio (W/L) is obtained actually.

It should be understood that the angular rate sensor 100 shown in FIG. 1 merely represents one embodiment mode of the angular rate sensor according to the present invention, and therefore, the present invention is not limited thereto.

In summary, the present invention may be applied if an angular rate sensor is constituted by the below-mentioned structural elements: That is, in such an angular rate sensor equipped with both a drive-purpose vibrator and an angular velocity detection-purpose vibrator, which have been supported on a supporting substrate in such a manner that these vibrators can be vibrated along direction perpendicular to each other, the angular velocity detection-purpose vibrator has been coupled via a detection beam onto the supporting substrate, and a drive-purpose vibrator has been coupled via a drive beam to the angular velocity detection-purpose vibrator, and further, the angular velocity detection-purpose vibrator includes a shape which is elongated along the vibration direction thereof.

Then, the major structure of such an angular rate sensor according to the present invention is featured by that the above-explained ratio (W/L) is larger than, or equal to 0.1, and also, other structural elements of this sensor may be properly modified.

Second Embodiment

Figure 8:
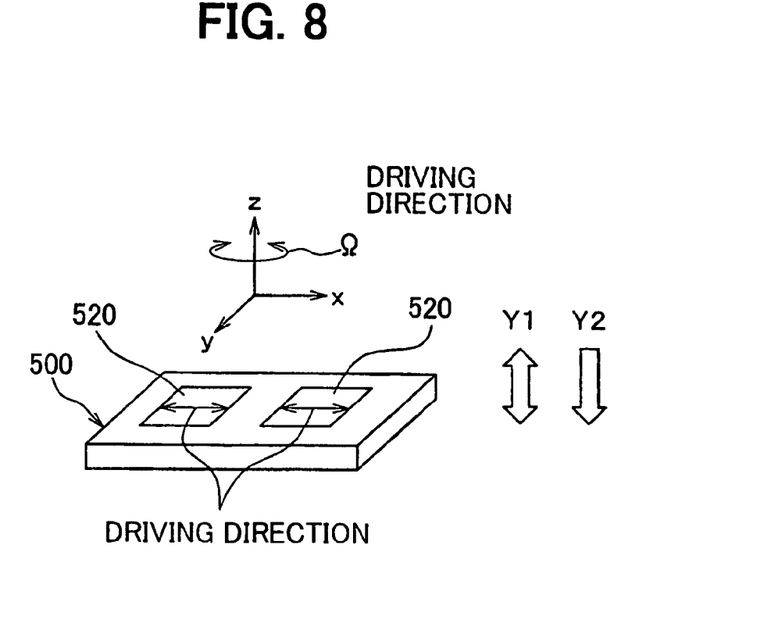
FIG. 8 is a schematic perspective view showing a vibrating type angular rate sensor, according to the comparison of the second embodiment.

The inventors have preliminary studied about an angular rate sensor mounted in such a way that a detection axis corresponding to a rotation axis of an angular velocity is directed to an upper and lower direction of a vehicle, namely the vertical direction. FIG. 8 is a diagram for schematically representing a mounting condition of such an angular rate sensor 500. It should be understood that a base member is omitted in FIG. 8.

While two pieces of vibrators 520 have been provided in this angular rate sensor 500, each of the vibrators 520 is driven to be vibrated along an "x" direction corresponding to a first direction, and further, when an angular velocity "Ω" is applied, each of the vibrators 520 is vibrated so as to detect the applied angular velocity "Ω" along a "y" direction corresponding to a second direction by Coriolis force.

In this case, an "x-to-y" plane corresponds to a horizontal plane, and a detection axis "z" of the angular velocity "Ω" corresponds to the upper and lower direction of the vehicle, namely the vertical direction. Then, this angular rate sensor 500 performs the angular velocity detecting operation based upon the detecting vibrations of the vibrator 520 in accordance with, for example, an electrostatic capacitance type detecting method.

In such an angular rate sensor 500, since the driving vibrations of the vibrators 520 are directed to the vertical direction with respect to a direction (namely, arrow "Y1" shown in FIG. 8) of upper and lower vibrations of the vehicle, or a direction (namely, arrow "Y2" shown in FIG. 8) of gravitational acceleration, there is a small influence thereof. Here, the arrow Y1 represents a vertical direction so that the detection axis z is parallel to the vertical direction Y1. The arrow Y2 represents a gravity direction.

However, in such a case that this angular rate sensor 500 is used so as to detect any other angular velocities than a yaw rate, the sensor 500 is mounted in such a manner that a detection axis z of an angular velocity is located parallel to the horizontal plane. The angular velocities other than this yaw rate correspond to, for instance, an angular velocity around an axis of a forward and backward direction of a vehicle, namely a roll rate, and also correspond to an angular velocity around an axis of a right and left direction of the vehicle, namely a pitch rate.

As a result, in the angular rate sensor 500, there are some risks that adverse influences caused by the upper and lower vibrations of the vehicle and the gravitational acceleration may be given with respect to the driving vibrations depending upon the direction of the driving vibrations of the vibrators 520. In other words, when the above-described upper and lower vibrations of the vehicle and the gravitational acceleration are applied to the vibrators 520 along the above vibration direction, the vibrating conditions of the driving vibrations become unequal to each other.

Originally, in a vibration type angular rate sensor, it is important how to stabilize driving vibrations of vibrators. However, a leakage of vibrations may occur in response to a change in conditions of the driving vibrations, and/or electric anomalies, caused by the driving vibrations being superimposed upon detection signals, so that precision of sensor output signals may be deteriorated.

Therefore, it is required, even when a detection axis of an angular velocity is directed to the horizontal plane, driving vibrations of vibrators is stabilized as much as possible.

In view of the above problem, a mounting structure of an angular rate sensor according to a second embodiment of the present invention is provided.

Figure 5:
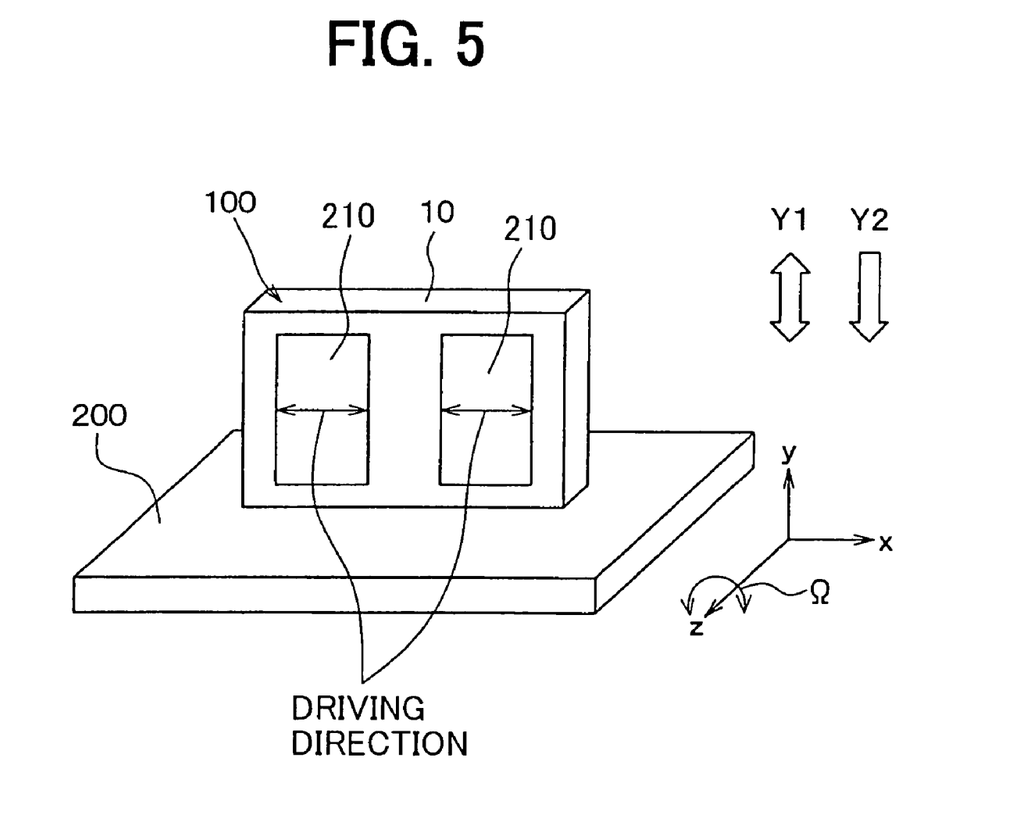
FIG. 5 is a schematic perspective view showing a mounting structure of an angular rate sensor on a mounting board, according to a second embodiment of the present invention.
Figure 6:
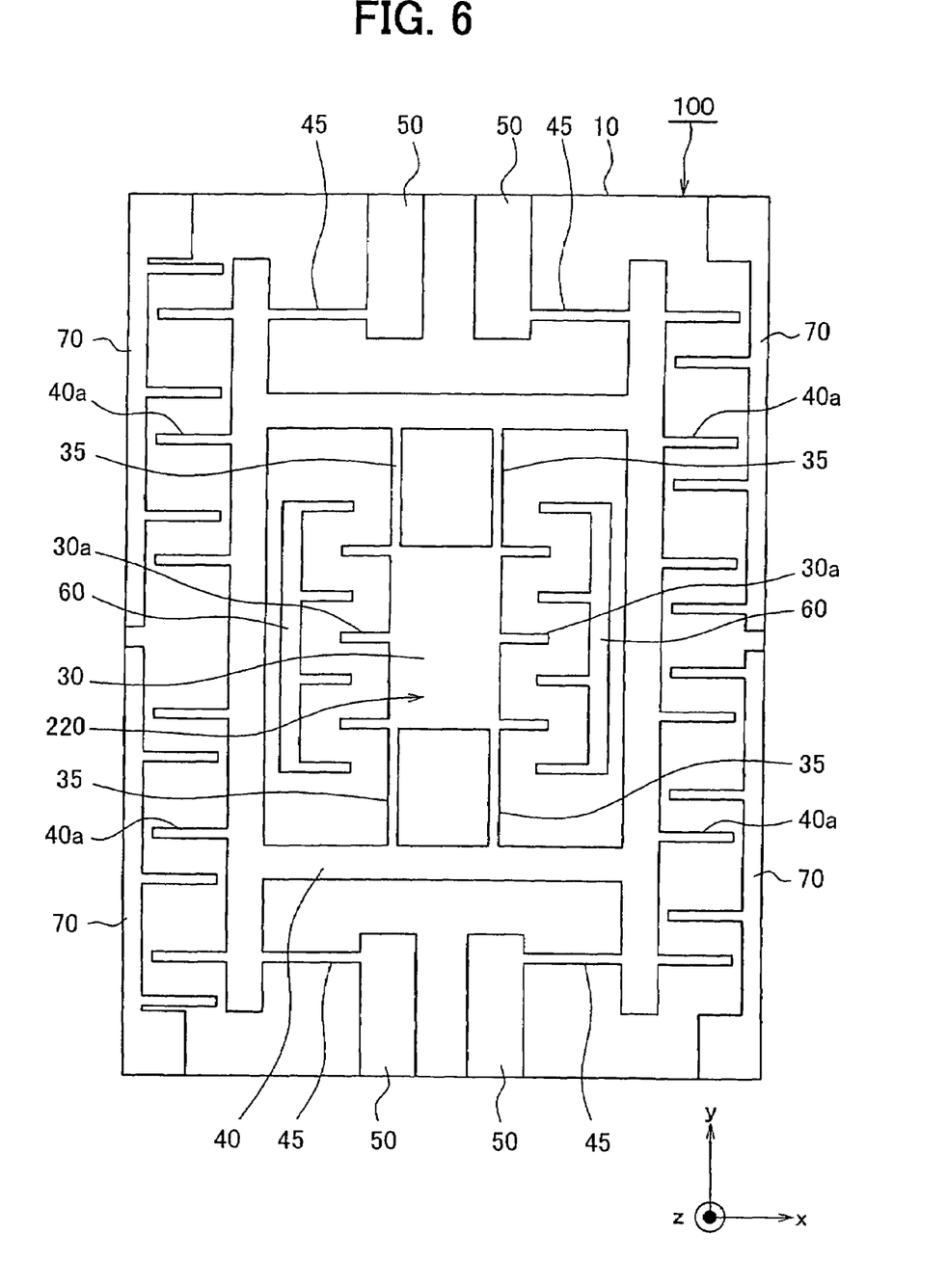
FIG. 6 is a plan view showing the sensor, according to the second embodiment.

FIG. 5 is a perspective view for schematically showing a mounting structure, according to the second embodiment mode, in which the angular rate sensor 100 is mounted on a mounting board (base member) 200. FIG. 6 is a diagram for schematically indicating a plane structure of the angler velocity sensor 100 shown in FIG. 5, namely, a plane view for indicating the angular rate sensor 100 as viewed from an upper plane of a substrate 10 which constitutes this sensor 100.

In this embodiment mode, the angular rate sensor 100 has been mounted on the mounting board 200 as such a sensor mounted on a vehicle (not shown), which detects an angular velocity around a forward and backward direction axis of the vehicle, namely detects a roll rate.

In FIG. 5, a detection axis "z" of an angular velocity "Ω" corresponds to such an axis which is elongated along the forward and backward direction of the vehicle; a driving vibration direction of each of the vibrators 210 corresponds to an "x" direction which is elongated along an upper and lower direction of the vehicle; and a detecting vibration direction of each of the vibrators 210 corresponds to a "y" direction which is elongated along an upper and lower direction of the vehicle, namely along a gravitational acceleration direction. Further speaking, an "x-to-z" plane corresponds to the horizontal plane, and the y direction corresponds to the vertical direction which is perpendicular to this "x-to-z" plane.

While the angular rate sensor 100 includes a substrate 10, a well-known micromachine process is carried out with respect to this substrate 10, so that the vibrators 210 are formed. In this embodiment mode, two pieces of the above-explained vibrators 210 have been formed.

Also, the mounting board 200 functioning as the base member is manufactured from a circuit board of an ECU of the vehicle, or the like. Then, since this substrate 10 is adhered onto the mounting board 200, the angular rate sensor 100 has been mounted on this mounting board 200 so as to be fixed thereon. It should be understood that the angular velocity 100 may be alternatively mounted on the mounting board 200 under such a condition that, for example, this angular rate sensor 100 has been stacked on another single circuit board (not shown).

First, the angular rate sensor 100 will now be explained with reference to, mainly, FIG. 6. It should also be understood that in this example, as represented in FIG. 5, the angular rate sensor 100 has been manufactured by arranging two pieces of the vibrators having the same structures along the "x" direction corresponding to the driving vibration direction. However, in order to avoid a duplication, only one of these two vibrators 210 is indicated in FIG. 6.

As the substrate 10 which constitutes this angular rate sensor 100, for instance, an SOI (silicon-on insulator) substrate having a rectangular shape may be employed. This SOI substrate is formed by such a way that a second silicon layer functioning as a second semiconductor layer is adhered via an oxide film functioning as an insulating film on a first silicon layer functioning as a first semiconductor layer.

Then, a trench etching process, a release etching process and the like are carried out with respect to a front surface layer of this substrate, for example, the second silicon layer provided in the SOI substrate, so that beam structural bodies 50, 60, 70, 220, 45 segmented by trenches have been formed, as shown in FIG. 6.

The beam structural bodies 50, 60, 70, 220, 45 have been constituted by mainly employing a vibrating body 220, respective beam portions 35 and 45, and also respective electrodes 60 and 70.

The vibrating body 220 has been formed at a center portion of the substrate 10 in such a manner that this vibrator 210 can be vibrated within a horizontal plane with respect to the substrate 10, namely, within a paper plane of FIG. 6. In this example, the vibrator 210 has been arranged by a first vibration unit 30 as a drive-purpose vibrator, a second vibration unit 40 as an angular velocity detection-purpose vibrator, and a driving beam unit 35 (i.e., a drive beam) as the beam portion for coupling the first vibration unit 30 to the second vibration unit 40. The first vibration unit 30 has a substantially rectangular shape and is located at the center portion. The second vibration unit 40 has a rectangular frame shape and is located at an outer peripheral portion of this first vibration unit 30.

This vibrating body 220 has been coupled via a detecting beam unit 45 as a detection beam with respect to an anchor unit 50 which has been provided at a peripheral portion of the substrate 10.

In this case, the anchor unit 50 has been fixed on a portion of the substrate 10, which is located under the surface layer where this beam structural body 220 has been formed, and supported by this portion, namely fixed and supported on a supporting substrate unit. The vibrating body 220 has been separated, i.e., apart from this supporting substrate unit under such a condition that this vibrating body 220 has been coupled to the anchor unit 50.

As indicated in FIG. 6, in this case, since the driving beam unit 35 is made in such a shape elongated along, for example, the "y" direction, this driving beam unit 35 can be elastically deformed along essentially only the "x" direction corresponding to the first direction. Also, since the detecting beam unit 45 is made in such a shape elongated along, for example, the "x" direction functioning as the first direction, the detecting beam unit 45 can be elastically deformed along essentially only the "y" direction corresponding to the second direction.

Then, a first vibrating unit 30 within the vibrating body 220 can be vibrated by the drive beam 35 along an "x" direction (driving vibration direction) within the horizontal plane with respect to the substrate 10. On the other hand, the entire portion of the vibrating body 220 can be vibrated by the detecting beam unit 45 along a "y" direction (detecting vibration direction) within the horizontal plane with respect to the substrate 10.

Also, the drive electrode 60 has been provided between the first vibration unit 30 and the second vibration unit 40, while this drive electrode 60 causes the first vibration unit 30 to be driven so as to be vibrated along the "x" direction.

Similar to the anchor unit 50, this drive electrode 60 has been fixed to the above-explained supporting substrate unit. Then, the drive electrode 60 has been arranged in an opposite sense in such a manner that a comb-shaped tooth portion of the drive electrode 60 is interleaved with a comb-shaped tooth portion (drive-purpose comb-shaped tooth portion) 30a which is projected from the first vibration unit 30.

Also, the detection electrode 70 has been provided as an electrode for detecting an angular velocity at an outer peripheral portion of the second vibration unit 40.

This detection electrode 70 is employed in order to detect an angular velocity around a "z" axis which is perpendicular to the substrate 10 based upon the vibrations of the vibrating body 220. Similar to the anchor unit 50, the detection electrode 70 has been fixed to the supporting substrate unit. The detection electrode 70 has been arranged in an opposite sense in such a manner that a comb-shaped tooth portion of the detection electrode 70 is interleaved with a comb-shaped tooth portion (detection-purpose comb-shaped tooth portion) 40a which is projected from the second vibration unit 40.

Also, in this angular rate sensor 100, pads (not shown) have been formed on proper portions of the substrate 10, and these pads are employed so as to apply voltages and to derive signals to/from the vibrating body 220, the drive electrode 60, the detection electrode 70, and the like.

For instance, while the pads have been formed at the peripheral portion of the substrate 10, bonding wires (not shown) made of Au (gold) and Al (aluminium) are connected to these pads. As a result, the angular rate sensor 100 may be electrically connected via the bonding wires, or the like, to the mounting board 200.

In this angular rate sensor 100, a drive signal (sine wave voltage etc.) is applied from the mounting board 200 and the like to the drive electrode 60 so as to generate electrostatic force between the comb-shaped tooth portion 30a of the first vibration unit 30 and the drive electrode 60. As a consequence, the first vibration unit 30 is driven to be vibrated along the "x" direction by elastic force of the driving beam unit 35.

When an angular velocity "Ω" corresponding to the roll rate is applied around the "z" axis corresponding to the detection axis under such a condition that this first vibration unit 30 is driven to be vibrated, Coriolis force is applied to the first vibration unit 30 along the "y" direction, and thus, the entire portion of the vibrating body 220 is driven to detect the applied Coriolis force along the "y" direction due to the elastic force of the detection beam 45.

As a consequence, since the capacitance between the comb-shaped teeth of the detection electrode 70 and the comb-shaped teeth of the detection-purpose comb-shaped tooth unit 40a is changed by this detecting vibration, this capacitance change is detected, so that a magnitude of the angular velocity "Ω" around the "z" axis can be acquired. Namely, a roll rate of the vehicle can be obtained.

Concretely speaking, in FIG. 6, when the vibrating body 220 is displaced in one direction along the "y" axis direction, as to the right-sided and left-sided detection electrodes 70 shown in FIG. 6, a capacitance change in the left-sided detection electrode 70 is varied in a reverse manner with respect to a capacitance change in the right-sided detection electrode 70. As a result, the capacitance changes occurred in the right-sided and left-sided detection electrodes 70 are converted into voltages, and then, both the voltage values are differentially amplified, so that the angular velocity "Ω" can be obtained as the roll rate.

The angular rate sensor 100 includes two pieces of the vibrators 210 having the same structures. In other words, two sets of the beam structural bodies 50, 60, 70, 220, 45 having the structures shown in FIG. 6 are formed along the "x" direction corresponding to the driving vibration direction in the substrate 10, which eventually constitute the angular rate sensor 100.

In this case, two pieces of the vibrators 210 are driven to be vibrated in an opposite phase with each other. Then, since the output signals derived from two pieces of the vibrators 210 are differentially processed, the acceleration components produced along the "x" direction can be canceled. As a result, the angular rate sensor 100 can detect the angular velocity without containing the above-described acceleration components in high precision. Apparently, only one piece of the vibrator 210 may be alternatively employed in the angular rate sensor 100.

Such a mounting structure may be provided which is realized by mounting the angular rate sensor 100 on the mounting board 200 corresponding to the base member. In the angular rate sensor 100, the vibrators 210 are driven to be vibrated along the "x" direction; and when the angular velocity "Ω" is applied under this driving vibration, the angular velocity "Ω" is detected based upon the vibrations (detecting vibrations) of the vibrators 20 along the "y" direction perpendicular to the "x" direction.

As indicated in FIG. 5, as the specific structure of this embodiment mode, in such a mounting structure of the angular rate sensor, the detection axis "z" which constitutes the rotation axis of the angular velocity and is intersected perpendicular to both the "x" direction and the "y" direction is located parallel to the x-to-z plane, namely the horizontal plane. In other words, the detection axis "z" of the angular velocity "Ω" constitutes such an axis which is perpendicular to the x-to-y plane corresponding to the vertical plane.

Moreover, as indicated in FIG. 5, as the specific structure of this embodiment mode, the "x" direction along which the vibrators 210 of the angular rate sensor are driven to be vibrated constitutes such a direction which is located parallel to the x-to-z plane corresponding to the horizontal plane, and is perpendicular to the detection axis "z".

In accordance with the mounting structure of the angular rate sensor 100, which includes the above-explained specific structure, the direction "x" of the driving vibration as to the vibrators 210 may constitute such a direction which is perpendicular to both the upper and lower vibrating direction "Y1" of the vehicle and the gravitational acceleration direction "Y2" thereof, as represented in FIG. 5. As a consequence, the adverse influences caused by the upper and lower vibrations of the vehicle and the gravitational acceleration can be reduced as little as possible with respect to the driving vibration.

Accordingly, in the mounting structure of the vibration type angular rate sensor 100, even in such a case that the detection axis "z" of the angular velocity is located parallel to the horizontal plane, the driving vibrations of the vibrators 210 can be stabilized as much as possible.

Figure 7:
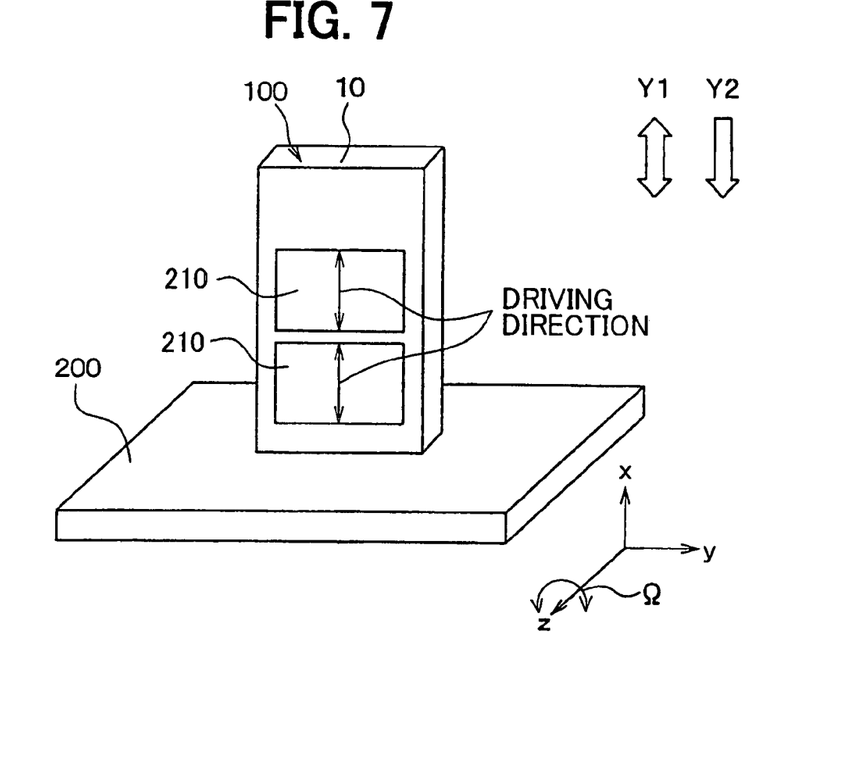
FIG. 7 is a schematic perspective view showing a mounting structure of an angular rate sensor on a mounting board, according to a comparison of the second embodiment.

As a comparison example, FIG. 7 is a perspective view for schematically showing a mounting structure for the angular rate sensor 100.

In this case, the "x" direction corresponding to the driving vibration direction of the vibrators 210 is made coincident with either the upper and lower vibration direction "Y1" of the vehicle or the gravitational acceleration direction "Y2" thereof, so that an unbalance condition is produced in the driving vibrations of the vibrators 210. In other words, when the vibrators 210 are displaced in an upward direction and a downward direction, two sets of displacement of the vibrators 210 do not become symmetrical displacement with each other due to adverse influences caused by either the upper and lower vibrations of the vehicle or the gravitational acceleration thereof.

To the contrary, in accordance with the mounting structure of this embodiment mode, the "x" direction corresponding to the driving vibration direction of the vibrators 210 is perpendicular to either the upper and lower vibration direction "Y1" of the vehicle or the gravitational acceleration direction "Y2" thereof, so that the adverse influences caused by the upper and lower vibrations of the vehicle and the gravitational acceleration thereof with respect to the driving vibration can be reduced as little as possible. Even in such a case that the detection axis "z" of the angular velocity is located parallel to the horizontal plane, the driving vibrations of the vibrators 210 can be stabilized as much as possible.

It should be understood that in the above-described embodiment mode, while the detection axis "z" of the angular velocity corresponds to such an axis which is elongated along the forward and backward direction of the vehicle, this detection axis "z" has been applied as the angular rate sensor 100 for detecting the roll rate.

Although not shown in the drawings, in this case, the detection axis "z" of the angular velocity may be alternatively defined as such an axis which is elongated along the right and left direction of the vehicle. In other words, the mounting structure of the present invention may be apparently applied to such an angular rate sensor capable of detecting a pitch rate.

Also, as the base member, the present invention is not limited only to the above-explained mounting board 200. Also, in the above-described embodiment mode, the angular rate sensor 100 has been mounted on the vehicle in combination with the mounting board 200 corresponding to the base member. Alternatively, the mounting structure of the present invention may be applied to such a sensor which is not mounted on a vehicle.

In summary, the present invention is mainly featured by mounting the angular rate sensor on the mounting structure mounted on the base member. That is to say, in the angular rate sensor, the vibrators are driven to be vibrated along the first direction; and when the angular velocity is applied under this driving vibration, the angular velocity is detected based upon the vibrations of the vibrators along the second direction perpendicular to the first direction. In this mounting structure, the detection axis which corresponds to the rotation axis of the angular velocity and are perpendicular to both the first direction and the second direction is located parallel to the horizontal plane; and the first direction along which the vibrators are driven to be vibrated corresponds to such a direction which is located parallel to the horizontal plane and is intersected to the detection axis. Detailed structures of this mounting structure may be properly modified.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A mounting structure comprising:
    a sensor; and
    a mounting board for mounting the sensor thereon, wherein the sensor includes a pair of vibrators capable of vibrating in a first direction,
    each sensor detects an angular velocity on the basis of vibration of the vibrator in a second direction in a case where the vibrator is vibrated in the first direction, and where the angular velocity is applied to the sensor in a third direction so that the third direction provides a rotation axis of the angular velocity,
    the vibrators of the pair of vibrators vibrate in phases that are opposite to one another;
    the second direction is perpendicular to the first direction,
    the third direction is perpendicular to both of the first and the second directions,
    the third direction is in parallel to a horizontal plane perpendicular to a gravitational direction, and
    the first direction is in parallel to the horizontal plane.

2. The mounting structure according to claim 1, wherein the sensor and the board are used in an automotive vehicle.

3. The mounting structure according to claim 2, wherein the third direction is in parallel to a front-and-back direction of the vehicle.

4. The mounting structure according to claim 2, wherein the third direction is perpendicular to a front-and-back direction of the vehicle.

5. The mounting structure according to claim 1, wherein
    each vibrator is an electrostatic capacitance type gyroscope, and
    a sine wave voltage is applied to each vibrator so that the vibrator vibrates in the first direction.

6. The mounting structure according to claim 1, wherein the sensor is an angular rate sensor, which includes:
    a support substrate;
    a drive-purpose vibrator supported on the substrate through a drive beam in such a manner that the vibrator is capable of vibrating in a first direction; and
    an angular velocity detection-purpose vibrator supported on the substrate through a detection beam in such a manner that the vibrator is capable of vibrating in a second direction, which is perpendicular to the first direction,
    the angular velocity detection-purpose vibrator extends in the second direction,
    the detection beam is deformable in the second direction,
    the drive beam is deformable in the first direction,
    the sensor detects an angular velocity on the basis of vibration of the angular velocity detection-purpose vibrator in the second direction, the vibration which is caused by a Coriolis force applied to the drive-purpose vibrator in a case where the drive-purpose vibrator is vibrated in the first direction, and where the angular velocity is applied to the sensor in a third direction so that the third direction provides a rotation axis of the angular velocity,
    the third direction is perpendicular to both of the first and the second directions,
    the angular velocity detection-purpose vibrator has a length along with the second direction and a width along with the first direction, and
    a ratio between the width and the length of the angular velocity detection-purpose vibrator is equal to or larger than 0.1.

7. The mounting structure according to claim 6, wherein
the ratio between the width and the length of the angular velocity detection-purpose vibrator is defined as X,
the angular velocity detection-purpose vibrator has a displacement amount in the second direction when the drive-purpose vibrator is vibrated in the first direction,
the displacement amount of the angular velocity detection-purpose vibrator is defined as Y in millimeters, and
the ratio and the displacement amount have the following relationship:

$$Y = 0.0148X^4 - 0.0076X^3 + 0.0015X^2 - 0.0001X + 6 \times 10^{-6}.$$

* * * * *